United States Patent [19]

Hosterman

[11] Patent Number: 4,562,741
[45] Date of Patent: Jan. 7, 1986

[54] PRESSURE RELIEF VALVE WITH PRESSURE INDICATING MEANS

[76] Inventor: Craig Hosterman, 131 NW. 4th St., No. 263, Corvallis, Oreg. 97330

[21] Appl. No.: 602,393

[22] Filed: Apr. 20, 1984

[51] Int. Cl.[4] .......................... F16K 17/40; G01L 9/12
[52] U.S. Cl. ........................................ 73/714; 73/724; 137/68.1; 361/283
[58] Field of Search ................. 73/714, 724, 718, 4 R; 361/283; 137/68 R

[56] References Cited

U.S. PATENT DOCUMENTS 4,232,698 11/1980 Hosterman et al. .................. 73/724

Primary Examiner—Donald O. Woodiel
Attorney, Agent, or Firm—Cahill, Sutton & Thomas

[57] ABSTRACT

A conventional rupturable curved disc in a pressure relief valve for high pressure cylinders serves as one plate of a capacitor. A curved segmented disc, alterable in curvature in response to deformation of the adjacently located curved disc, serves as the other plate of the capacitor. The segmented disc accommodates and conforms to the normal expected deformation of the curved disc, which deformation is due to repeated fill cycles of the cylinder, without altering the maximum and minimum capacitance during each cycle. The segmented disc physically bears against a translatable electrically conductive plunger element. The plunger element is electrically connected to an impedance variation sensing circuit, which circuit senses and provides an output signal responsive to a change in the capacitance between the curved and segmented discs during each cycle; such output signal reflects the actual pressure, and hence state of fill, of the cylinder.

6 Claims, 7 Drawing Figures

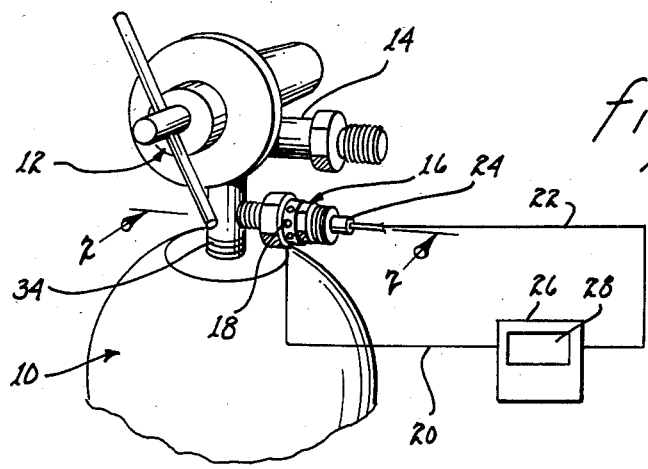
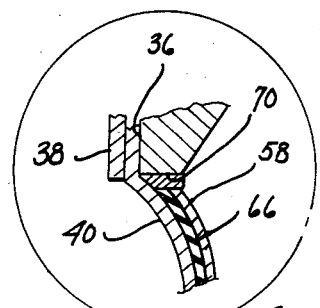
fig. 1
fig. 2a
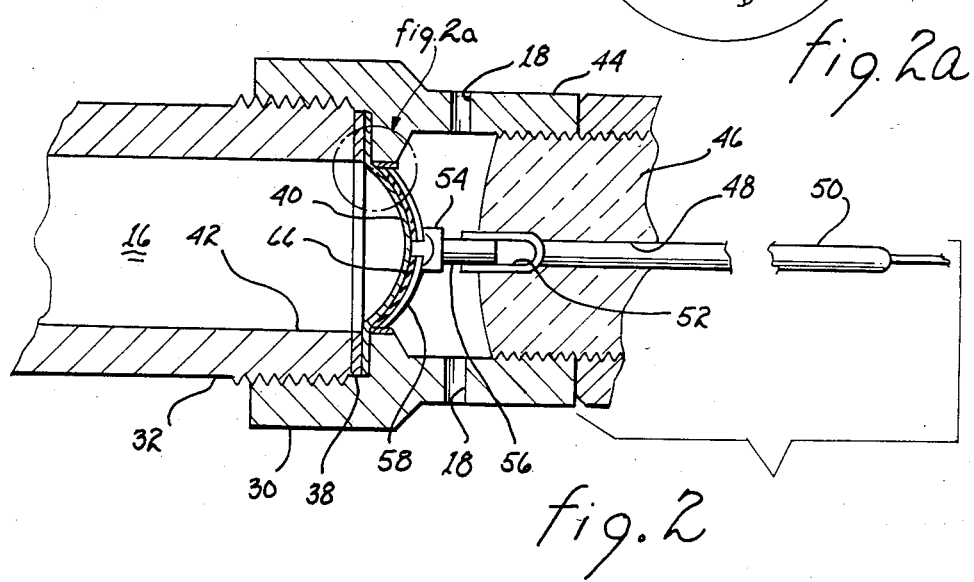
fig. 2
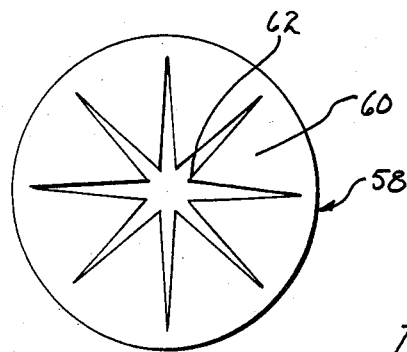
fig. 3

PRESSURE RELIEF VALVE WITH PRESSURE INDICATING MEANS

The present invention is an improvement over the invention described in the U.S. Pat. No. 4,232,698, entitled "Pressure Relief Valve with Pressure Indicating Means".

The present invention relates to pressure relief valves for pressure cylinders and, more particularly, to pressure relief valves which provide an indication of the pressure within the cylinder irrespective of the number of fill and evacuation cycles of the cylinder.

Conventional cylinders which house a fluid under pressure, whether the fluid be a liquid or a gas, include a conventional valve for controlling the outflow for the fluid and an upstream located pressure relief valve. These cylinders, generally referred to as bottles, are usually filled at a depot to a predetermined pressure, which pressure equates with the quantity of fluid contained therein. During use of these bottles, pressure gauges are sometimes not employed and the quantity of the contents within the bottles is not always accurately known when the bottles are returned to the depot for refilling. Prior to refilling of the bottles, they are generally evacuated (pursuant to federal regulations); thus, a user who returns for refilling partly filled bottles will lose the benefit of the unused contents. This "lost cost factor" can be substantial over a period of time. Unnecessarily, the users of the bottles often waste time and effort in returning nearly filled bottles. Moreover, the users sometimes misjudge the quantity of contents remaining and run out of fluid at inopportune moments.

It is, of course, possible to attach conventional gauges to the bottle and thereby obtain an accurate indication of the quantity of fluid remaining. However, the attachment of such gauges is time consuming. Another method of determing the contents of each bottle is that of weighing the bottle. However, such weighing requires accurate scales and detachment of the bottle from any equipment to which it might be attached.

There are prior art devices relating to the present invention, including the safety relief valve described in U.S. Pat. No. 2,526,794. Various pressure responsive impedance variable devices are illustrated and described in U.S. Pat. Nos. 2,367,866 and 3,222,581. Circuitry for providing an indication of pressure extant within a chamber is described in U.S. Pat. No. 2,355,088.

In the present invention, a conventional rupturable curved disc is electrically mated with an adjacently located segmented disc to provide a source of impedance variable in proportion to the pressure within an accompanying bottle. Due to the nature of the material of the conventional rupturable curved disc, deformation by increased curvature thereof (displacement at center) occurs to a more or less perceptable degree during each evacuation and fill cycle. Therefore, the curvature of the rupturable disc is repetitively altered. Such alteration is accommodated by the segmented disc without incurring an accompanying change in the capacitive range of the capacitor formed by the curved and segmented discs during each evacuation of the bottle. Such constancy in capacitive range is achieved by deformation of the segmented disc in correspondence with equivalent deformation of the rupturable disc during each fill cycle. A translatable plunger element is physically and electrically in contact with the segmented disc and serves as an electrical conductor to maintain electrical continuity. Impedance sensing circuitry is electrically connected across the plunger element and the rupturable disc, which circuitry generates a signal responsive to the impedance of and generated by the capacitor and reflective of the state of pressure and hence state of fill of the bottle.

It is, therefore, a primary object of the present invention to provide a means for obtaining an indication of the pressure of a fluid within a high pressure cylinder during any of many fill and evacuation cycles.

Another object of the present invention is to provide an indication of the pressure of a fluid within a high pressure cylinder despite cumulative deformation during each fill cycle of a pressure responsive element.

Yet another object of the present invention is to provide apparatus for maintaining constant the range of variation of a pressure sensing element in a high pressure cylinder despite repeated deformations of such element due to repeated fills of the cylinder.

Yet another object of the present invention is to provide apparatus for maintaining constant the capacitive range of adjacent capacitor plates of a pressure sensing element mounted within a pressure relief valve despite deformation of one of the plates.

A further object of this invention is to provide a deformable capacitor within a pressure relief valve which capacitor maintains a predetermined capacitive range subsequent to such deformations.

A yet further object of the present invention is to provide an inexpensive pressure relief valve which provides an indication of the pressure acting upon the valve despite deformation of the valve resulting from multiple fill and evacuation cycles of an attached high pressure cylinder.

These and other objects of present invention will become apparent to those skilled in the art as the description there proceeds.

The present invention may be described with greater specificity and clarity with reference to the following drawings, in which:

FIG. 1 illustrates a pressure relief valve embodying the present invention in the stem of a valve connected to a high pressure cylinder;

FIG. 2 is a cross-sectional view taken along lines 2—2, as shown in FIG. 1 and FIG. 2a is a detail view of structure shown in FIG. 2;

FIG. 3 is a plan view of a segmented disc located within the pressure relief valve;

Figure 4:
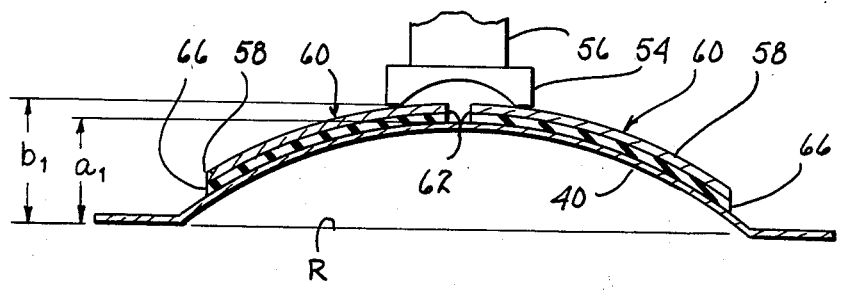
FIG. 4 illustrates a first state, reflective of a filled cylinder, of the pressure responsive elements within the pressure relief valve.

Referring to FIG. 1, there is shown a conventional high pressure cylinder or bottle 10 which bottle might contain a fluid, such as oxygen or other gas. A conventonal valve assembly 12, including an outlet pipe 14, is generally permanently attached to the bottle. It is to be understood that many configurations serving the function of valve assembly 12 are in commercial use. For most fluids, federal regulations require that the relief valve be attached to bottle 10 to prevent explosion in the event the pressure of the fluid within the bottle exceeds the pressure retaining capacity of the bottle. Therefore, most permanently attached valve assemblies also include a pressure relief valve, which valve is identified by numeral 16.

In order to determine the degree of fill of bottle 10, a pressure gauge is generally used and the indication of pressure provided thereby can be used to calculate the degree of fill. The attachment of the pressure valve, such as to outlet pipe 14, is time consuming and necessitates a loss of fluid upon removal of the pressure gauge. For some fluids, such loss is inconsequential, but where toxic or poisonous fluids are released, severe health hazards may be present. Additionally, some financial detriment results from the loss of fluids. Aside from these losses, the necessary time for an operator to attach a pressure gauge, obtain a reading therefrom and then detach the pressure gauge, represents a substantial labor expense, which expense should be avoided if possible.

As pressure relief valve 16 is necessarily always in fluid communication with the interior of bottle 10, the conventional rupturable element or curved disc contained therein is responsive by flexing to the ambient pressure. Should the pressure within bottle 10 increase beyond the specified upper limits, the flexing capability of the disc will have been exceeded and it will rupture. Upon rupture, the fluid will flow through the rupture and be dissipated through relief ports 18 disposed as part of the pressure relief valve. As the rupturable disc flexes in response to pressure variations, such flexing, if the disc constitutes one plate of a capacitor, produces a change in capacitance or impedance of the capacitor. By maintaining a second plate of the capacitor in a fixed position relative to the maximum (full) pressure position of the first plate, the variation in impedance of the capacitor resulting from the flexing disc in response to pressure variations can be sensed by impedance responsive circuitry.

Still referring to FIG. 1, there is shown an electrical conductor 20 electrically attached to the housing of pressure relief valve 16, which housing is electrically connected to the flexing disc. An electrical conductor 22 is electrically attached to lead 24, which lead is an electrical communication with the second plate of the capacitor. A sensing circuit 26 is responsive to a variation in the electrical signal across electrical conductors 20 and 22 which signal results from a change in impedance of the capacitor. The response sensed may be displayed upon a meter 28 to reflect either the degree of pressure or the amount of fluid within bottle 10.

Referring to FIG. 2, the constructional details of pressure relief valve 16 will be described. A collar 30 threadedly engages a hollow stem 32 extending from outlet pipe 34 (see FIG. 1) of valve assembly 12. Collar 30, by means of annular shoulder 36 and a malleable annular seat 38 sealingly secures a rupturable flexible curved disc 40 across outlet 42 of stem 32. Thereby, leakage through stem 32 will not occur unless curved disc 40 ruptures. In the event curved disc 40 ruptures, a fluid flow through the curved disc will be dissipated through relief ports 18 extending through shank 44 of collar 30.

Generally, curved disc 40 may be of beryllium copper or nickel-based alloys which have electrical properties suitable for employing the curved disc as one plate of a capacitor and are of sufficient elasticity and tensile strength to flex predictably in response to pressure variations within the cylinder. An electrically insulating centrally apertured plug 46 is in threaded engagement with the interior surface of shank 44. Central passageway 48 within plug 46 supports a pedestal 50, one end of which includes a cylindrical cavity 52. A dished contact 54 is attached to a translatable shank 56, which shank is slidably located within cylindrical cavity 52. The tolerance of fit between shank 56 and cylindrical cavity 52 is such that the shank will slide under pressure (in response to a force) but it will not return to its former position and it will maintain the new position. Both the dished contact and its shank are electrically transmissive and in electrical communication with pedestal 50 via the surface of cavity 52.

Referring jointly to FIGS. 2 and 3, the elements forming the capacitor within the pressure relief valve will be described. A curved centrally segmented disc 58 includes a pluarlity of inwardly extending segments 60. Each segment may be triangular shaped as illustrated and may have an apex 62 located in proximity to the center of the disc. The segments should be manufactured to have a permanent bias against curvature to a smaller radius of curvature. During original installation, apices 62 of the segmented disc will be compressed against dished contact 54 to a smaller radius of curvature. Because of the bias, the segments will continuously bear against the dished contact despite translation of the dished contact. Electrical separation between curved disc 40 and segmented disc 58 may be established by a layer of insulation 66 developed upon the surface of the segmented disc facing the curved disc. An insulating ring 66 is located circumferentially within bore 70 of collar 30 to prevent segmented disc 58 from shifting laterally and from preventing electrical contact with the collar.

As illustrated in FIG. 2, the free ends terminating at apices 62 of segments 60 acting through dished contact 54 will force shank 56 to translate axially further into cylindrical cavity 52. Thereby, further bending for an increase in curvature of segmented disc 58 is not inhibited and yet electrical contact between the segmented disc and dished contact 54 is maintained inviolate.

It is well known that each fill cycle of bottle 10 will cause a degree of displacement or deformation of the curved disc which results in a permanent increased curvature. Despite each such deformation, the curved disc will respond to a reduction in pressure within the bottle during evacuation by a physical change to a less curved (displaced) configuration. For reasons not presently precisely known, the amount of reduced curvature (or displacement) of the curved disc resulting during a reduction in pressure within the bottle will be essentially constant despite previous substantial increases in curvature in the curved disc due to deformation thereof resulting from past repeated fill cycles.

Because curved disc 40 is deformed in curvature during each fill cycle, even though the change in displacement it exhibits during each evacuation cycle is essentially constant, a second element associated therewith to render the combination functional as a capacitor must be deformed in a similar manner and to the same extent. Otherwise, the impedance represented by curved disc 40 and segmented disc 58 acting as the plates of a capacitor would progressively alter as deformation occurred. An indication responsive to such impedance would not be indicative of the state of fill of the bottle. It is therefore the function of segmented disc 58, in cooperation with curved disc 40, to serve as a reference point to permit the two discs to act as a capacitor capable of providing useful information.

It is known that conventionally sized rupturable discs, like curved disc 40, may be deformed and displaced at the center on the order of 0.020–0.030 inches during the life of the pressure relief valve. It is also known that the change in displacement at the center of the curved disc during each evacuation cycle is on the order of 0.001 inch. This latter displacement remains essentially constant even though the center of the disc may have been deformed 0.030 inch during past fill cycles.

During each evacuation and fill of bottle 10, curved disc 40 will respond by a change in displacement or curvature, in the order of 0.001 inch as noted above, in response to the attendant pressure variations acting thereon. As such pressure variations do not act upon segmented disc 58, the latter is maintained in a stable physical configuration. Accordingly, the capacitance between curved disc 40 and segmented disc 58 will be a function of the change in curvature of curved disc 40. Such change in capacitance may be sensed by circuitry 26 and indicated by meter 28 as the degree of fill of bottle 10.

Each new fill of bottle 10 will cause further deformation of curved disc 40 resulting in increased curvature of the disc, which increased curvature will impose an increased pressure upon each of segments 60, causing angular displacement of each segment. Such displacement of the segments results in translation or displacement of apices 62 away from one another and in the direction of dished contact 54. The resulting force exerted by apices 62 upon the dished contact will produce commensurate translation of shank 56 within cavity 52 as a function of both the force exerted and the surface configuration of the dished contact against which the apices bear.

It may be emphasized that physical and electrical contact between the apices and the dished contact is maintained during such change in displacement or curvature of segments 60. Moreover, as the surface area of segmented disc 58 coincident with curved disc 40 remains essentially unchanged, the basic parameters of the capacitor formed remain essentially constant.

As curved disc 40 reduces in displacement or curvature upon evacuation of bottle 10, no corresponding force will act upon segmented disc 58 and the latter will remain in a stable position. Accordingly, the degree of capacitance between the two discs will change during evacuation and the change can be indicated by meter 28. During the next fill of bottle 10, further deformation of curved disc 40 will occur and commensurate repositioning of segments 60 and displacement of apices 62 will result and the segmented disc is repositioned to a new reference location.

Figure 5:
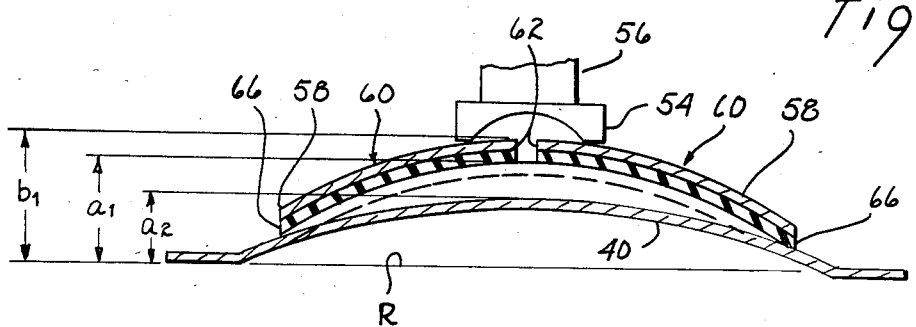
FIG. 5 illustrates a second state, reflective of an evacuated cylinder, of the pressure responsive elements within the pressure relief valve.
Figure 6:
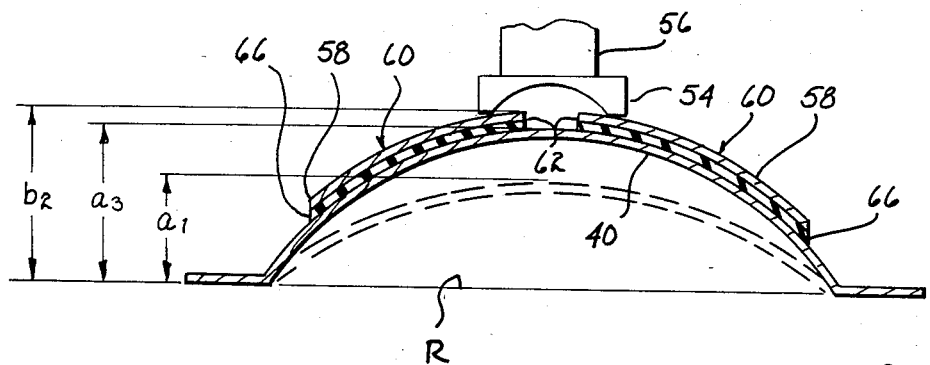
FIG. 6 illustrates a third state, reflective of an again filled cylinder, of the pressure responsive elements within the pressure relief valve.

The above described relationships are graphically illustrated in FIGS. 4, 5, and 6. For demonstrative purposes it will be assumed that the configuration of curved disc 40, segmented disc 58 and dished contact 54 shown in FIG. 4 represents a filled state of an associated bottle 10. In this state, the displacement of curved disc 40 from a reference line, "R", is equivalent to the distance represented by "$a_1$". Likewise, the displacement of the apex of segmented disc 58 is equivalent to the distance represented by "$b_1$".

FIG. 5 is representative of a second state of fill of bottle 10, in this case empty. The displacement of the apex of curved disc 40 is now represented by "$a_2$" and the displacement of the apex of segmented disc 58 is still represented by "$b_1$", as no force has acted upon the segmented disc to induce a change in displacement. For reasons stated above, the difference between dimensions $a_1$ and $a_2$ is approximately 0.001 inches.

FIG. 6 illustrates a second state of fill of bottle 10 which fill cycle has caused a deformation of curved disc 40. Dimension $a_1$ represents the maximum displacement of curved disc 40 during the previous cycle. During the subsequent fill, curved disc 40 has been deformed to locate the apex at a displacement represented by "$a_3$", where $a_3$ is greater than $a_1$; the displacement or curvature of the curved disc has therefore been increased. The increased curvature of curved disc 40 acting upon segmented disc 58 will cause a change in displacement or curvature of the segmented disc. Such change in curvature results in relocating apices 62 further from each other and from reference line R at a dimension equivalent to $b_2$ where $b_2$ is greater than $b_1$. The difference between $b_2$ and $b_1$ is the same as the difference between $a_3$ and $a_1$. During the next evacuation cycle, the changes described with reference to FIG. 5 would be repeated.

It may be noted that the material of which the segmented disc is formed must be of such stability and elasticity to permit displacement or deformation in response to the deformed expansion of curved disc 40 but, due to the originally imposed bias the segmented disc is not permitted to resume its previus state of curvature.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A pressure relief valve apparatus operatively attached to a high pressure cylinder for providing an indication of the pressure within the cylinder, said apparatus comprising in combination:
   (a) impedance means disposed within the pressure relief valve for providing an impedance representative of the pressure within the cylinder, said impedance means comprising a capacitor having a first disc flexibly responsive to the pressure within the cylinder for defining one plate of said capacitor and a second disc for defining another plate of said capacitor, said second disc including means responsive to said first disc for displacing the center portion of said second disc commensurate with deformation in curvature of said first disc;
   (b) means for sensing the impedance of said capacitor and for indicating at least a relative value for the pressure within the cylinder; and
   (c) means for electrically interconnecting each of said first and second discs with said sensing and indicating means.

2. The apparatus of claim 1 wherein said displacing means includes a plurality of segments extending inwardly from the perimeter of said displacing means.

3. The apparatus of claim 2 wherein each segment of said plurality of segments comprises a triangular segment extending radially inwardly and terminating at an apex.

4. The apparatus of claim 3 wherein said interconnecting means comprises a plunger element in electrical contact with said apices and means for translating said plunger element in response to displacement of said apices.

5. The apparatus of claim 2 wherein said interconnecting means includes means translatably responsive to displacement of said segments for maintaining electrical continuity between said second disc and said sensing means.

6. The apparatus of claim 5 wherein said maintaining means comprises a translatable plunger element.

* * * * *